Figure 1:
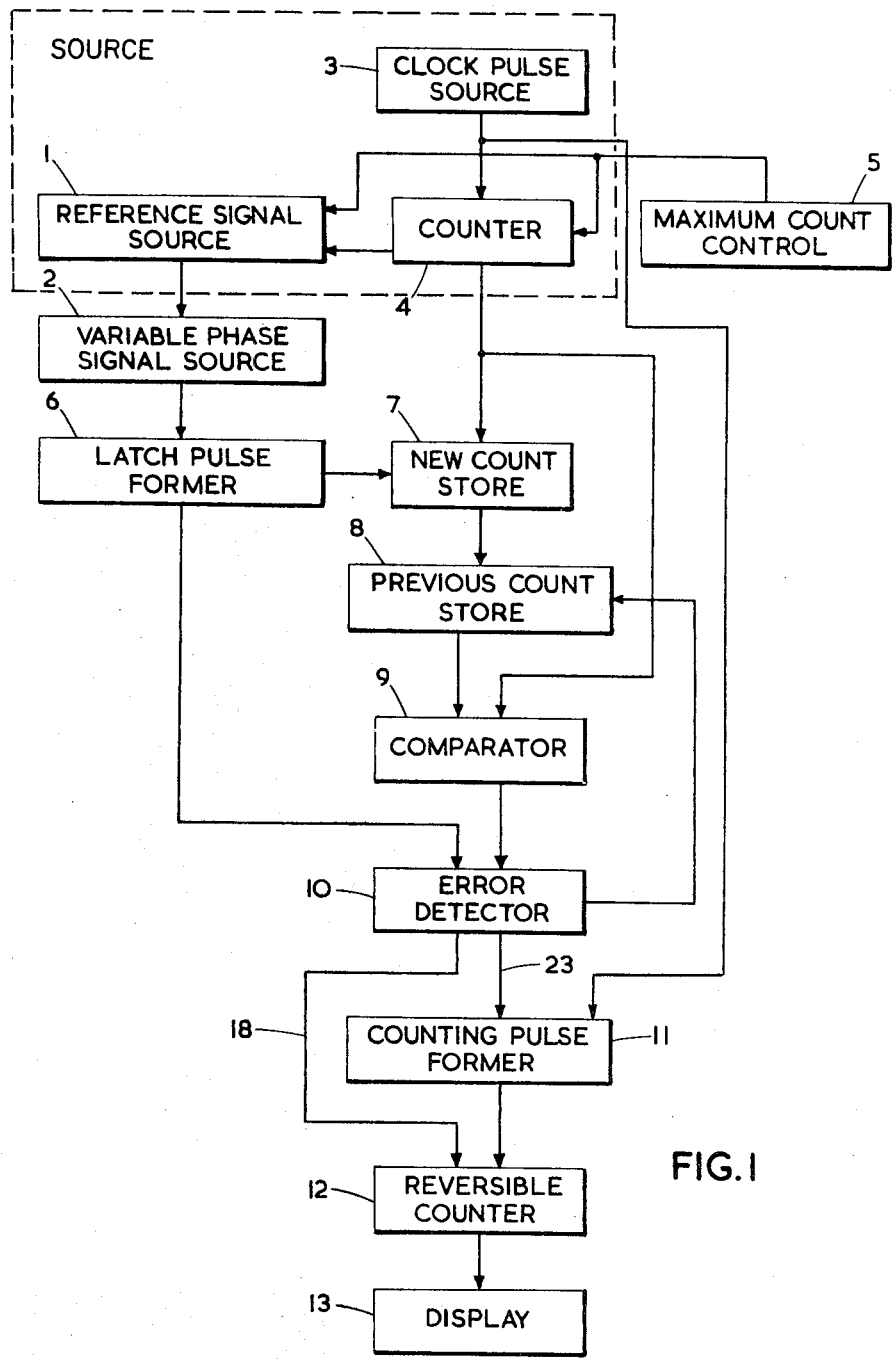

United States Patent
Faulkes et al.

[15] 3,683,345
[45] Aug. 8, 1972

[54] PHASE-RESPONSIVE CIRCUITS

[72] Inventors: Kenneth Milford Faulkes; Alan Michael Hayes, both of Bradford, England

[73] Assignee: The English Electrical Company Limited, London, England

[22] Filed: Dec. 23, 1969

[21] Appl. No.: 887,584

[30] Foreign Application Priority Data

Jan. 3, 1969 Great Britain............462/69

[52] U.S. Cl. ...........340/207 P, 324/83 D, 318/608, 235/92 MP, 235/92 PS
[51] Int. Cl. ..................................G08c 19/16
[58] Field of Search......307/232, 222; 340/207 P, 347 SY; 324/83 D; 235/92 MP, 92 PS, 92 CC; 328/133, 155; 318/601, 608

[56] References Cited

UNITED STATES PATENTS

| 3,268,713 | 8/1966 | Klinikowski | 235/92 MP |
| 3,490,017 | 1/1970 | Kolell et al. | 235/92 CC |
| 3,500,022 | 3/1970 | Toscano | 307/222 |

FOREIGN PATENTS OR APPLICATIONS 1,158,097  7/1969  Great Britain...........324/83 D

OTHER PUBLICATIONS

IBM Technical Disclosure, Vol. 13, No. 7, Dec. 1970, "Detecting Phase Error in Phase Encoded Data," Horowitz et al., pp. 1867–1869.

Primary Examiner—John W. Caldwell
Assistant Examiner—Robert J. Mooney
Attorney—Misegades & Douglas, Keith Misegades and George R. Douglas, Jr.

[57] ABSTRACT

This invention relates to a circuit which provides an indication, on a display, of phase changes in signals from a variable phase signal source. The phase of these signals may vary in dependence upon displacement of, for example, a machine slide. The number of clock pulses generated by a clock pulse source between the occurrence of the leading edge of a reference signal and the occurrence of the next leading edge of the variable phase signal gives a measure of the phase relationship between the two signals. Changes in phase between successive cycles of the variable phase signal are detected by a comparator and a detector which cause a number of counting pulses, equal to the difference between the clock pulse counts of the two successive cycles, to be fed to a reversible counter, together with a "Count Up" or a "Count Down" instruction. The number in the counter and in the display gives a measure of the resultant phase shift relative to the phase at the time of setting the counter. The number of clock pulses generated per cycle of the reference signal may be chosen so that the number displayed gives the machine slide displacement directly in inches or metric units.

8 Claims, 5 Drawing Figures

PHASE-RESPONSIVE CIRCUITS

This invention relates to phase-responsive circuits.

According to the invention a phase-responsive circuit for indicating changes in phase of an input signal includes a source of regularly spaced pulses, means to detect the number of said pulses generated between the occurrence of a selected point of a cycle of a reference signal and the occurrence of a corresponding point of a concurrent cycle of the input signal, and means responsive to a difference in the number of pulses detected for successive cycles of the input signal to indicate said changes in phase.

Preferably the circuit is arranged to provide, at any instant, an indication of the change in phase of the input signal relative to its phase at the beginning of a period of operation of the circuit.

The circuit may be used in displacement measuring apparatus in which the input signal is generated by a phase analogue transducer, the phase of the input signal varying in dependence upon the displacement measured.

The means to provide an indication of the resultant phase change may then indicate the resultant displacement measured during the period.

The indication of displacement may be displayed in one standard of measurement (for example inches) and the indication may be changed to another standard (for example millimeters) by selection of a different number of pulses per reference cycle. If N pulses are generated for each cycle of the reference signal for indicating a displacement in inch units, a repetition rate of, for example, 1.016N or 1.27N pulses per cycle will provide an indication in metric units.

Figure 2:
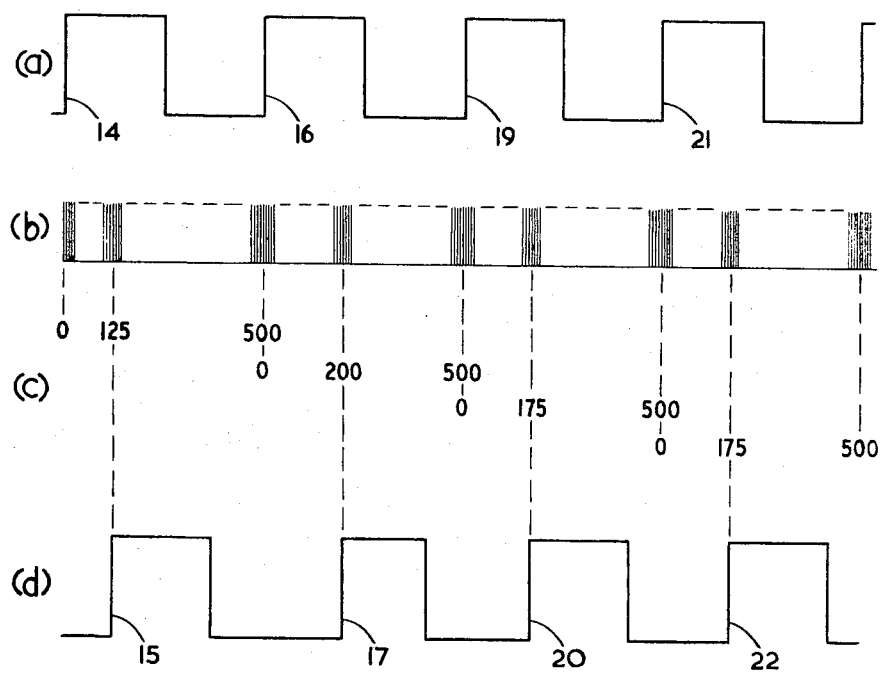

One embodiment of the invention will now be described, by way of example, with reference to the accompanying drawings in which:

FIG. 1 is a schematic block diagram of a circuit in accordance with the invention; and FIG. 2 is a timing diagram illustrating the operation of the circuit.

Referring now to FIG. 1 of the drawings, a signal from a reference signal source 1 is fed to a variable phase signal source 2 which generates a signal having the same frequency as the reference signal, but having a variable phase relative to the reference signal. The source 2 may, for example, be any kind of phase analogue transducer such as a synchro and may be used to provide a signal the phase of which varies in dependence upon a quantity (displacement, velocity etc.) which is to be measured.

A clock pulse source 3 generates a continuous train of pulses which are fed into a free-running counter 4. The count at which the counter 4 resets to zero and starts again is controlled by a maximum count control 5. The reference signal from the source 1 is derived from the counter 4 and the control 5 such that each cycle of the reference signal is completed when the counter 4 resets to 0. In a particular application as described below, the number of pulses in each train may be set at either 500 pulses or 508 pulses per cycle of the reference signal.

FIG. 2A of the drawings shows a square wave reference signal whilst FIG. 2B represents the output of the clock pulse source 3 comprising 500 pulses for each cycle of the reference signal as indicated in FIG. 2C.

FIG. 2D shows the signal from the source 2 and, merely for the sake of illustration, the first three cycles of this signal are shown as having relatively different phases. In practice, the phase of successive cycles may not be able to change by such large steps as those illustrated.

At the beginning of each cycle of the reference signal a count of the clock pulses is started. The count reaches 499 and on the next clock pulse resets to 000, the beginning of a new reference cycle. A latch pulse is fed from a latch pulse former 6 to store the current value of the count in a "new count" store 7 each time a positive-going edge of the signal from the source 2 is detected. Hence, the store 7 contains a count representing the delay between the leading edge of the reference signal and the leading edge of the variable phase signal.

This count is passed to a "previous count" store 8 when any change of phase has been detected. The count in the counter 4 is compared continuously with the previous count in the store 8 by a comparator 9. The latch pulse and the output signal from the comparator 9 are fed to an "error" or phase change detector 10, which detects any change of phase of the signal from the source 2. When a phase change occurs, the detector 10 passes the instruction "Count", over a line 23, to a counting pulse former 11 and passes an "Up" or a "Down" instruction, indicating the required direction over a line 18 to a reversible counter 12. The counting pulse former 11 is preferably a gating device which is opened or closed by the detector 10 to allow or inhibit the passage of counting pulses from the clock pulse source 3 to the reversible counter 12. The counter 12 operates a display 13 to indicate a change in count and hence a change in phase of the variable phase signal. The operation of the detector 10 and the associated stages is as follows.

Starting at the first leading edge 14 of the reference signal shown in FIG. 2A, clock pulses are fed to the store 7. When the first leading edge 15 of the variable phase signal occurs, a latch pulse is generated by the latch pulse former 6 and the current count is stored in the store 7. The count in the store 7 would then be 125 as shown in FIG. 2C. If it is assumed that no change of phase has occurred since the previous cycle, the count in the store 8 will also be 125.

It will be assumed that the phase of the variable phase signal has been retarded for the next cycle and the count will therefore reach a higher number than 125 before the occurrence of the next leading edge 17 (and hence before the next latch pulse is generated). When the count reaches 125, the comparator 9 recognizes the equality of this count and the previous count in the store 8, and, in the absence of a latch pulse, the detector 10 generates the instructions "Count" and "Up". The counting pulse former 11 then gates a clock pulse to the reversible counter 12 for this count and for each succeeding count for which the latch pulse is absent. Each pulse, in accordance with the "Up" instruction, adds 1 to the digit of least significance in the counter 12 and in the display 13.

When the count in the counter 4 reaches 200, the next leading edge 17 of the variable phase signal occurs and a latch pulse is applied to the store 7 to store the count. By this time 75 counting pulses have been fed to the counter 10 and the number displayed will therefore have increased by 75.

The detector 10, on receiving the latch pulse, ceases to generate the "Count" instruction, and no further pulses are gated by the counting pulse former 11. At the same time the count of 200 passed from the store 7 to the store 8. For the sake of example, it will be assumed that the phase of the variable phase signal is advanced for the next cycle. The leading edge 20 of the variable phase signal, and hence the next latch pulse, then occurs when the new count reaches 175 i.e. before the previous count of 200.

The latch pulse is therefore fed to the detector 10 before the comparator 9 indicates equality between the previous count and the current count. In this case the detector 10 generates the instructions "Count" and "-Down" for this count and for each succeeding count until the comparator 9 detects equality between the counts in the store 8 and the counter 4, i.e. when the latter count reaches 200. 25 pulses have by then been passed to the counter 12 and in accordance with the "-Count" and "Down" instructions the number on the display 13 will have been reduced by 25.

The count of 175 in the store 7 then passes to the store 8 and no further counting takes place. For the sake of example it will be assumed that the phase of the variable phase signal does not change for the next cycle. The leading edge 22 of the variable phase signal, and hence the next latch pulse, therefore occurs at the same instant as the comparator 9 detects equality between the new and previous counts. No counting pulses are, therefore, fed to the counter 12 and the number displayed therefore remains unchanged.

If the display 13 is set at 0 or at some other predetermined number at the start of the operation, the number displayed at any subsequent instant provides an indication of any shift in the phase of the variable phase signal at the instant relative to its phase at the start of the operation.

As an example of a particular application of the circuit, the variable phase signal source 2 may be a synchro attached to the lead screw of a machine tool (not shown) and arranged to provide a signal the phase of which varies linearly with the displacement of a tool slide etc. positioned by the lead screw.

In this example it will be assumed that a phase shift in the range 0° to 360° represents a corresponding displacement in the range 0 to 0.05 inches. In the above case in which 500 clock pulses are generated in each cycle of the reference signal, each clock pulse, and hence each pulse counted in the counter 10 and indicated on the display 13, corresponds to 0.0001 inch displacement and the display therefore gives a direct indication in inch units. Since the indication is incremental, it will at any instant indicate the resultant displacement of the slide which has taken place since first setting the display 13.

In the number of clock pulses per cycle of the reference signal is changed to 508 by the control 5, each clock pulse gated to the counter 12 will correspond to a displacement of 2.5 micrometers and the display can give a direct indication of the displacement in metric units. An alternative to 508 pulses per reference cycle is 635 pulses per reference cycle. In this case each clock pulse gated to the counter 12, will correspond to a displacement of 2.0 micrometers.

Any number of clock pulses per cycle may be selected depending upon the particular application of the apparatus, but it will be seen that if N clock pulses per cycle give a direct indication in inch units, 1.016N or 1.27N pulses per cycle will give the indication in metric units.

Although for the sake of illustration the reference and variable phase signals are shown as square waves, either or both of the signals can be in any other cyclic form such as sine waves. The start and finish of the clock pulse count can then occur, for example, at the points on the reference and variable phase signals respectively, at which the wave form is positive-going and crosses the zero axis. Alternatively any other cyclically recurring points on both wave forms can be chosen.

Similarly, although the reference and variable phase signals and the clock pulses are all shown as positive pulses, any of the signals could be negative-going provided that the circuit elements are arranged to accept the signals.

The circuit can be used in any application in which the input signal is a variable phase signal. Since the counter 12 produces an incremental count representing the resultant change in phase during a period, it does not need any fixed datum. Hence at the beginning of the period the number in the display 13 may be set at any desired value.

We claim:

1. A phase-responsive circuit for indicating changes in phase of a variable phase signal source, comprising
    a source 1,3,4 of regularly spaced pulses for producing a reference output signal,
    a variable phase signal source 2 responsive to said reference output signal of the source for generating a signal having the same frequency as the source but having a variable phase relative to the reference output signal,
    a latch pulse former 6 to detect the number of said regularly spaced pulses from said source generated between the occurrence of a selected point of a cycle of said reference output signal and the occurrence of a corresponding point of a concurrent cycle of the generated signal of said variable phase signal source,
    first storage means 7 to store a pulse count of a number of said regularly spaced pulses detected by said latch pulse former driving a currently occurring cycle of the generated signal of the variable phase signal source and thereby producing an output when a change in phase has been detected,
    second storage means 8 to receive the output of said first storage means,
    a comparator 9 responsive to a count of the regularly spaced pulses and the count of said second storage means,
    a means 10 responsive to the latch pulse former and the comparator to indicate changes of phase of the variable signal source.

2. A circuit as claimed in claim 1 in which a counting pulse former means 11 is responsive to said means being gated in response to said means to allow or inhibit the passage of said regularly spaced pulses from said source to a load.

3. The circuit as claimed in claim 2 wherein said load is a reversible counter.

4. The circuit as claimed in claim 3 wherein a display 13 in response to the reversible counter indicates a change in count and hence a change in phase of the variable phase signal source.

5. The circuit as claimed in claim 1 wherein said source includes a clock pulse source 3 and a counter 4, the predetermined number of clock pulses of said clock pulse source being N, and in which said predetermined number has either of two values having the ration N to 1.016N, or N to 1.27N, so that said difference in the number of pulses detected during successive cycles represents the displacement in either inch or metric units, respectively.

6. The circuit as claimed in claim 1 wherein said source includes a clock pulse source 3 that generates a continuous train of pulses fed to a free running counter 4.

7. The circuit as claimed in claim 6 wherein said source includes a reference signal source 1 responsive to the control of counter 4 and a miximum count control 5 such that each cycle of the reference signal is completed when the counter 4 is reset to 0.

8. A circuit as claimed in claim 1 wherein a display is responsive to said means to indicate a change in count and a change in phase of the variable signal source.

* * * * *